(12) United States Patent
Choi et al.

(10) Patent No.: US 8,075,864 B2
(45) Date of Patent: Dec. 13, 2011

(54) GRAPHENE SHEET AND PROCESS OF PREPARING THE SAME

(75) Inventors: Jae-young Choi, Suwon-si (KR); Hyeon-Jin Shin, Suwon-si (KR); Seon-mi Yoon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 163 days.

(21) Appl. No.: 12/168,440

(22) Filed: Jul. 7, 2008

(65) Prior Publication Data

US 2009/0068471 A1 Mar. 12, 2009

(30) Foreign Application Priority Data

Sep. 10, 2007 (KR) .................. 10-2007-0091642

(51) Int. Cl.
*C01B 31/04* (2006.01)
(52) U.S. Cl. ..................... 423/448; 423/447.1
(58) Field of Classification Search .................. 423/448, 423/447.1
See application file for complete search history.

(56) References Cited

U.S. PATENT DOCUMENTS

| 5,698,341 A | * | 12/1997 | Tamaki et al. | 429/231.8 |
| 6,716,409 B2 | * | 4/2004 | Hafner et al. | 423/447.1 |
| 7,071,258 B1 | * | 7/2006 | Jang et al. | 524/496 |
| 2003/0186059 A1 | * | 10/2003 | Hirata et al. | 428/408 |
| 2005/0227146 A1 | | 10/2005 | Ghantous et al. | |
| 2005/0271574 A1 | | 12/2005 | Jang et al. | |

OTHER PUBLICATIONS

Schniepp et al., Functionalized Single Grapehen Sheets Derived from Splitting Graphite Oxide, Apr. 11, 2006, The Journal of Physical Chemistry Letters, 110, 8535-8539.*
PCT Notification of Transmittal of the International Search Report and the Written Opinion of the International Searching Authority or the Declaration- International Application No. PCT/KR2008/004551; Date of Mailing: Feb. 16, 2009.

* cited by examiner

*Primary Examiner* — Jerry A Lorengo
*Assistant Examiner* — Pritesh Darji
(74) *Attorney, Agent, or Firm* — Cantor Colburn LLP

(57) ABSTRACT

Provided are a graphene sheet and a process of preparing the same. Particularly, a process of economically preparing a large-area graphene sheet having a desired thickness and a graphene sheet prepared by the process are provided.

20 Claims, 3 Drawing Sheets

GRAPHENE SHEET AND PROCESS OF PREPARING THE SAME

This application claims priority to Korean Patent Application No. 10-2007-0091642, filed on Sep. 10, 2007, in the Korean Intellectual Property Office, and all the benefits accruing therefrom under 35 U.S.C. §119, the contents of which are incorporated herein in their entirety by reference.

BACKGROUND OF THE INVENTION

This disclosure relates to a graphene sheet and a process of preparing the same. In particular, this disclosure also relates to a process of economically manufacturing a graphene sheet having a large area and having a desired thickness.

Generally, graphite is a multi-layered stack of two-dimensional graphene sheets formed from a planar array of carbon atoms bonded into hexagonal structures. Single-layered or multi-layered graphene sheets have beneficial properties in the area of electrical conductivity.

One noticeable beneficial property is that electrons flow in an entirely unhindered fashion in a graphene sheet, which is to say that the electrons flow at the velocity of light in a vacuum. In addition, an unusual half-integer quantum Hall effect for both electrons and holes is observed in these graphene sheet.

The electron mobility in graphene sheets is about 20,000 to about 50,000 square centimeter per volt second ($cm^2/Vs$). In addition, it is advantageous to use graphene sheets since products made from graphite are inexpensive while similar products made using carbon nanotubes are expensive due to low yields during the synthesis and the purification processes. This high cost occurs despite the fact that the carbon nanotubes themselves are inexpensive. Single wall carbon nanotubes exhibit different metallic and semiconducting properties that are dependent upon their chirality and diameter. Furthermore, single wall carbon nanotubes having similar semiconducting characteristics have different energy band gaps depending upon their chirality and diameter. Thus, in order to obtain a metallic single wall carbon nanotube composition or a semiconducting single wall carbon nanotube composition, it is desirable to separate the single wall carbon nanotubes from each other in order to obtain desired metallic or semiconducting characteristics respectively. However, separating the single wall carbon nanotubes is not a simple or inexpensive process.

On the other hand, it may be advantageous to use graphene sheets instead of carbon nanotubes since it may be possible to design a device that exhibits desired electrical characteristics by arranging the crystalline orientation in a suitable desired direction since electrical characteristics of a graphene sheet are changed according to the crystalline orientation. These characteristics of the graphene sheet may be advantageously used in carbonaceous electrical devices or carbonaceous electromagnetic devices of the future.

However, although the graphene sheet has these advantageous characteristics, a method of economically and reproducibly preparing a large-area graphene sheet has not yet been developed. Methods of preparing graphene sheets are classified into micromechanical methods and a silicon carbide (SiC) thermal decomposition method.

In the micromechanical method, a tape having a layer of adhesive on it such as, or example, a SCOTCH™ tape is applied against a graphite surface that has graphene layers preferably stacked in parallel. The graphene layers attach to the SCOTCH™ tape, which is subsequently removed from the graphite surface. The graphene layers are then removed from the SCOTCH™ tape. The graphene layers that are removed by the SCOTCH™ tape are however, not uniform in size nor do they have uniform shapes. In addition, graphene sheets having large surface areas cannot be extracted by this method. This makes their use questionable or even undesirable in certain applications.

In the SiC thermal decomposition method, a single crystal SiC is heated to remove Si by decomposing the SiC on the surface, and then residual carbon C forms on a graphene sheet. However, the single crystal SiC used in SiC thermal decomposition is very expensive, and a large-area graphene sheet cannot be easily manufactured.

SUMMARY OF THE INVENTION

Disclosed herein a process of economically preparing a large-area graphene sheet having a desired thickness.

Disclosed herein too is a graphene sheet prepared by the process.

Disclosed herein too are articles manufactured from the graphene sheet derived from the aforementioned process. The articles include a membrane, a hydrogen storage medium, an optical fiber and an electrical device.

Disclosed herein too is a graphene substrate that comprises the aforementioned graphene sheet.

Disclosed herein too is a process for preparing a graphene sheet, the process including forming a graphitizing catalyst in the form of a sheet; coating a polymer on the graphitizing catalyst; and heat-treating the graphitizing catalyst in an inert or reductive atmosphere to form a graphene sheet.

The graphitizing catalyst may be a catalytic metal. The catalytic metal can be a transition metal. In one embodiment, the catalytic metal is selected from the group consisting of Ni, Co, Fe, Pt, Au, Al, Cr, Cu, Mg, Mn, Mo, Rh, Si, Ta, Ti, W, U, V and Zr.

The polymer may be a self-assembling polymer.

The polymer may be selected from the group consisting of an amphiphilic polymer, a liquid crystal polymer and a conductive polymer.

The amphiphilic polymer may include a hydrophilic group; the hydrophilic group being selected from the group consisting of an amino group, a hydroxyl group, a carboxyl group, a sulfate group, a sulfonate group, a phosphate group, a phosphonate group, and salts thereof; and a hydrophobic group; the hydrophobic group being selected from the group consisting of a halogen atom, a C1-C30 alkyl group, a C1-C30 halogenated alkyl group, a C2-C30 alkenyl group, a C2-C30 halogenated alkenyl group, a C2-C30 alkynyl group, a C2-C30 halogenated alkynyl group, a C1-C30 alkoxy group, a C1-C30 halogenated alkoxy group, a C1-C30 hetero alkyl group, a C1-C30 halogenated hetero alkyl group, a C6-C30 aryl group, a C6-C30 halogenated aryl group, a C7-C30 arylalkyl group and a C7-C30 halogenated arylalkyl group.

The amphiphilic polymer is selected from the group consisting of capric acid, lauric acid, palmitic acid, stearic acid, myristoleic acid, palmitolic acid, oleic acid, stearidonic acid, linolenic acid, capryl amine, lauryl amine, stearyl amine and oleyl amine.

The conductive polymer is selected from the group consisting of polyacetylene, polypyrrole, polythiophene, polyaniline, polyfluorene, poly(3-hexylthiophene), polynaphthalene, poly(p-phenylene sulfide) and poly(p-phenylene vinylene).

The conductive polymer is selected from the group consisting of acene and its derivatives, hetero acene and its derivatives, anthracene and its derivatives, hetero anthracene and its derivatives, tetracene and its derivatives, hetero tetracene and its derivatives, pentacene and its derivatives, and hetero pentacene and its derivatives.

The polymer may include a polymerizable functional group, i.e., a polymeric precursor having a polymerizable functional group may be disposed upon the graphitizing catalyst and then subjected to polymerization upon being disposed on the graphitizing catalyst. Polymeric precursors may include monomers, dimers, trimers, pentamers, or the like. Even larger polymeric species having about 10 to about 100 repeat units and having suitable functional groups can be disposed upon the graphitizing catalyst and then subjected to polymerization.

After disposing a polymer on the graphitizing catalyst, a heat treatment may be performed at a temperature of about 400 to about 2,000° C. for about 0.1 to about 10 hours.

The graphitizing catalyst may be immobilized on a substrate.

The process may further include separating the graphite sheet by removing the graphitizing catalyst using an acid-treatment. This acid treatment is done after the heat-treatment.

The thickness of the graphene sheet may be controlled by adjusting the amount of the polymer.

The heat-treatment may be performed by induction heating, radiating heat energy, laser, infrared rays (IR), microwaves, plasma, ultraviolet (UV) rays or surface plasmon heating.

The heat-treatment may be selectively applied to the graphitizing catalyst.

The graphene sheet may be formed of polycyclic aromatic molecules in which a plurality of carbon atoms are covalently bound to each other. The graphene sheet may have 1 to 300 layers and the width and length of each graphene sheet may be about 1 mm or longer.

The graphene sheet may have about 1 to about 60 layers, and preferably about 1 to about 15 layers.

The width and length of the graphene sheet may be each from about 1 to about 1,000 mm.

The width and length of the graphene sheet may respectively be longer than about 10 mm.

Disclosed herein too is an article comprising a graphene substrate having a graphene sheet disposed thereon.

The graphene substrate may further include a graphitizing catalyst layer interposed between the substrate and the graphene sheet.

The substrate may be silicon.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
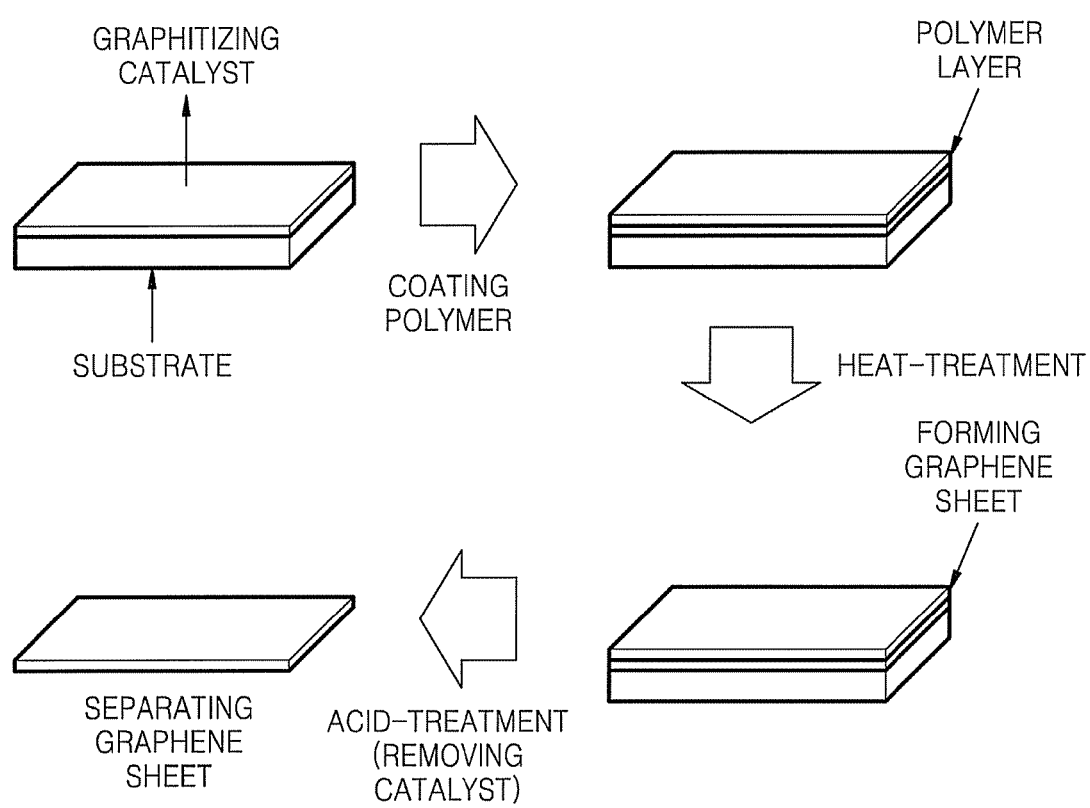
FIG. 1 is an exemplary depiction that schematically shows a process of preparing a graphene sheet.

Hereinafter, the present invention will now be described more fully with reference to the accompanying drawings, in which exemplary embodiments of the invention are shown.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second", and the like do not imply any particular order but are included to identify individual elements. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Disclosed herein is a process of economically preparing graphene sheets having a large surface area that are of a desired thickness. The graphene sheet can be advantageously used in numerous articles.

The term "graphene sheet" as used herein indicates graphene in the form of a sheet formed of polycyclic aromatic molecules in which a plurality of carbon atoms are covalently bound to each other. The covalently bound carbon atoms form 6-membered rings (which is the predominant repeating unit of the graphene sheet), but can also form 5-membered rings and/or 7-membered rings. Accordingly, in the graphene sheet it appears as if the covalently bound carbon atoms (usually, $sp^2$ bond) form a single layer. The graphene sheet may have various structures and the structure may vary according to the amount of the 5-membered rings and/or the 7-membered rings present in the graphene sheet. The graphene sheet may have not only a single layer of graphene, but may also be multi-layered comprising a plurality of layers up to 300 layers. Generally, the ends of the graphene are saturated with hydrogen atoms.

The graphene sheet may be formed by coating a polymer on a graphitizing catalyst to form a coated graphitizing catalyst, and heat-treating the resultant coated graphitizing catalyst in an inert or reductive atmosphere as shown in FIG. 1. During the heat-treatment, the polymer undergoes degradation and other components of the polymer except for the carbon atoms are evaporated. The residual carbon atoms that remain upon the graphitizing catalyst are bound to each other in a planar hexagonal structure to form the graphene sheet.

The graphitizing catalyst binds carbon atoms included in the polymer and assists the formation of the planar hexagonal structure of the carbon atoms. For example, any catalyst used to synthesize graphite, induce carbonization or manufacture carbon nanotubes can be used as the graphitizing catalyst. The catalyst may comprise a catalytic metal. Examples of catalytic metals are transition metal catalysts. Other metal catalysts can be used as well. Transition metal catalysts can be alloyed with other metal catalysts. The catalyst may be at least one selected from the group consisting of nickel (Ni), cobalt (Co), iron (Fe), platinum (Pt), gold (Au), aluminum (Al), chromium (Cr), copper (Cu), magnesium (Mg), manganese (Mn), molybdenum (Mo), rhodium (Rh), silicon (Si), tantalum (Ta), titanium (Ti), tungsten (W), uranium (U), vanadium (V) and zirconium (Zr). In one embodiment, the graphitizing catalyst may be in the form of a plate or sheet that comprises the catalytic metal. In another embodiment, the graphitizing catalyst can comprise a catalytic metal that is immobilized on a substrate by deposition, sputtering, or the like.

Any polymer that includes carbon atoms can be coated on the graphitizing catalyst, and the structure and composition of the polymer are not limited. It is therefore desirable to use an organic polymer to coat the graphitizing catalyst. A polymer that forms a dense coating can be used in order to form a dense graphite layer.

The organic polymer that is disposed on the graphitizing catalyst may be selected from a wide variety of thermoplastic polymers, thermosetting polymers, blends of thermoplastic polymers, blends of thermosetting polymers, or blends of thermoplastic polymers with thermosetting polymers. The thermoplastic polymer may also be a blend of polymers, copolymers, terpolymers, or combinations comprising at least one of the foregoing thermoplastic polymers. The thermoplastic polymer can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at last one of the foregoing thermoplastic polymers.

Figure 2:
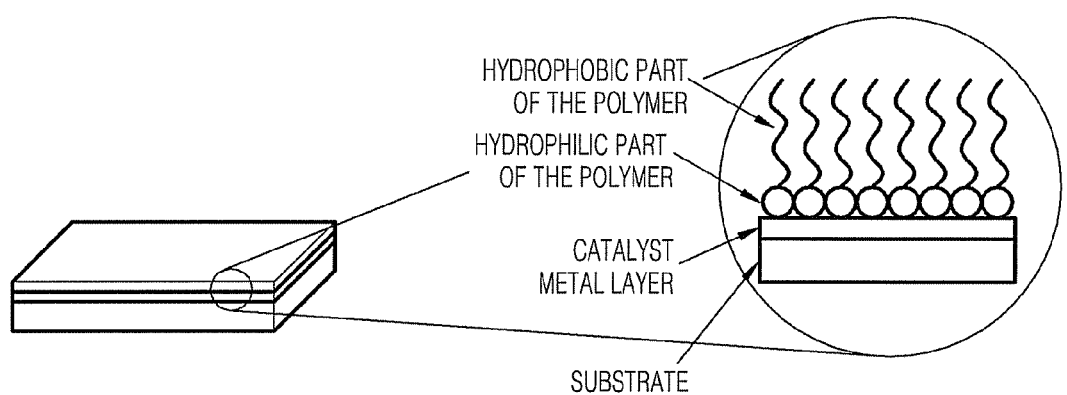
FIG. 2 is an exemplary depiction that schematically shows a polymer coated on a catalyst.
Figure 3:
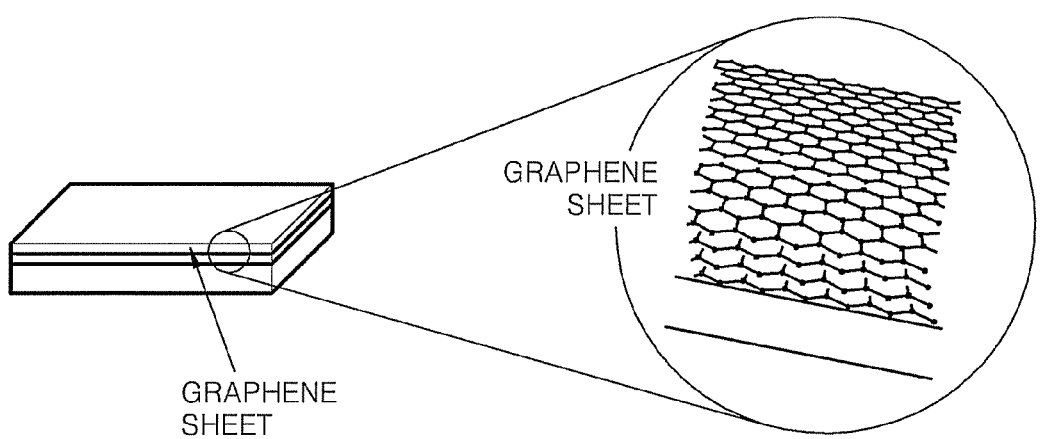
FIG. 3 is an exemplary depiction that schematically shows a structure of a graphene sheet formed on a catalyst.

In general, when polymers disposed on the graphitizing catalyst through spin coating, dip coating, or the like, they form an irregular network structure and are irregularly arranged, and thus the graphite layer cannot have a dense structure. On the other hand, when a self-assembling polymer is disposed upon on the graphitizing catalyst, the polymer is regularly arranged in vertical directions on the surface of the graphitizing catalyst as shown in FIG. 2, and thus a graphene sheet having a dense structure can be prepared as shown in FIG. 3.

Any self-assembling polymer can be disposed upon the graphitizing catalyst without limitation. For example, the self-assembling polymer can be selected from the group consisting of an amphiphilic polymer, a liquid crystal polymer and a conductive polymer.

The amphiphilic polymer includes both a hydrophilic group and a hydrophobic group, and thus can be arranged in a uniform direction in a water soluble solution. For example, Langmuir-Blodgett arrangements, dipping arrangements and spin arrangements are possible.

The amphiphilic polymer includes a hydrophilic group having at least one of an amino group, a hydroxyl group, a carboxyl group, a sulfate group, a sulfonate group, a phosphate group, a phosphonate group, and salts thereof; and a hydrophobic group having at least one of a halogen atom, a C1-C30 alkyl group, a C1-C30 halogenated alkyl group, a C2-C30 alkenyl group, a C2-C30 halogenated alkenyl group, a C2-C30 alkynyl group, a C2-C30 halogenated alkynyl group, a C1-C30 alkoxy group, a C1-C30 halogenated alkoxy group, a C1-C30 hetero alkyl group, a C1-C30 halogenated hetero alkyl group, a C6-C30 aryl group, a C6-C30 halogenated aryl group, a C7-C30 arylalkyl group and a C7-C30 halogenated arylalkyl group. Examples of the amphiphilic polymer are capric acid, lauric acid, palmitic acid, stearic acid, myristoleic acid, palmitolic acid, oleic acid, stearidonic acid, linolenic acid, capryl amine, lauryl amine, stearyl amine and oleyl amine.

The liquid crystal polymer can be arranged in a uniform direction in a liquid state so as to form an oriented liquid crystal polymer. The conductive polymer is dissolved in a solvent to form a membrane and can form a crystalline structure by being aligned after the solvent is evaporated. Thus, the polymers can be aligned on the graphitizing catalyst by processes that facilitate orientation such as for example, spin coating, or the like. Examples of the conductive polymer are polyacetylene, polypyrrole, polythiophene, polyaniline, polyfluorene, poly(3-hexylthiophene), polynaphthalene, poly(p-phenylene sulfide) and poly(p-phenylene vinylene).

Copolymers or blends of conductive polymers with other non-electrically conducting organic polymers may also be disposed on the graphitizing catalyst. Examples of non-electrically conducting organic polymers that can be copolymerized or blended with the electrically conductive polymer are polymethylmethacrylates, polyacrylates, polyamides, polyesters, polyetherketones, polyether ether ketones, polyether ketone ketones, polycarbonates, polyarylene ethers, epoxies, polysulfones, polyethersulfones, polyetherimides, or the like, or combinations comprising at least one of the foregoing polymers.

Meanwhile, polymers that are automatically aligned when deposited from vapor state can be used. Electrically conducting polymers that can be disposed upon the graphitizing catalyst from the vapor state and which undergo alignment upon being disposed can also be used. Examples of such conductive polymers are acene and its derivatives, anthracene and its derivatives, hetero anthracene (e.g., benzodithiophene and dithienothiophene) and its derivatives, tetracene and its derivatives (e.g., halogenated tetracene, tetracene derivatives having a polar substituent, tetracene-thiophene hybrid materials, rubrene and alkyl- and alkoxy-substituted tetracene), hetero tetracene and its derivatives, pentacene and its derivatives (e.g., alkyl- and halogen-substituted pentacene, aryl-substituted pentacene, alkynyl-substituted pentacene, alkynyl-substituted alkyl and alkynyl pentacene and alkynyl-substituted pentacene ether), hetero pentacene and its derivatives, and hetero acene and its derivatives.

The polymer may include at least one polymerizable functional group capable of forming a carbon-carbon double bond or triple bond. The polymerizable functional group can induce polymerization of polymers through a process of polymerization such as UV irradiation after the polymer layer is formed. Since the polymer thus formed has a large molecular weight, evaporation of carbon can be prevented during the heat-treatment of the polymer.

The polymerization of the polymer may be performed before or after coating the polymer on the graphitizing catalyst. That is, when the polymerization is conducted prior to coating the polymer on the graphitizing catalyst, the polymer layer on the graphitization layer can be formed by transferring a polymer membrane onto the graphitizing catalyst. The polymerization and transfer can be repeated several times to control the thickness of the graphene sheet.

The polymer can be aligned on the surface of the graphitizing catalyst using various coating methods, such as Langmuir-Blodgett, dip coating, spin coating and vacuum deposition. The molecular weight of the aligned polymer, thickness of the polymer layer or the number of self-assembling polymer layers may vary depending on a desired number of layers of the graphene sheet. That is, use of a polymer having a large molecular weight increases the number of layers of the graphene sheet since the polymer has a large amount of carbon. As the thickness of the polymer layer increases, the number of layers of the generated graphene sheet is increased, and thus the thickness of the graphene sheet is also increased. The thickness of the graphene sheet can be controlled using the molecular weight of the polymer.

Figure 4:
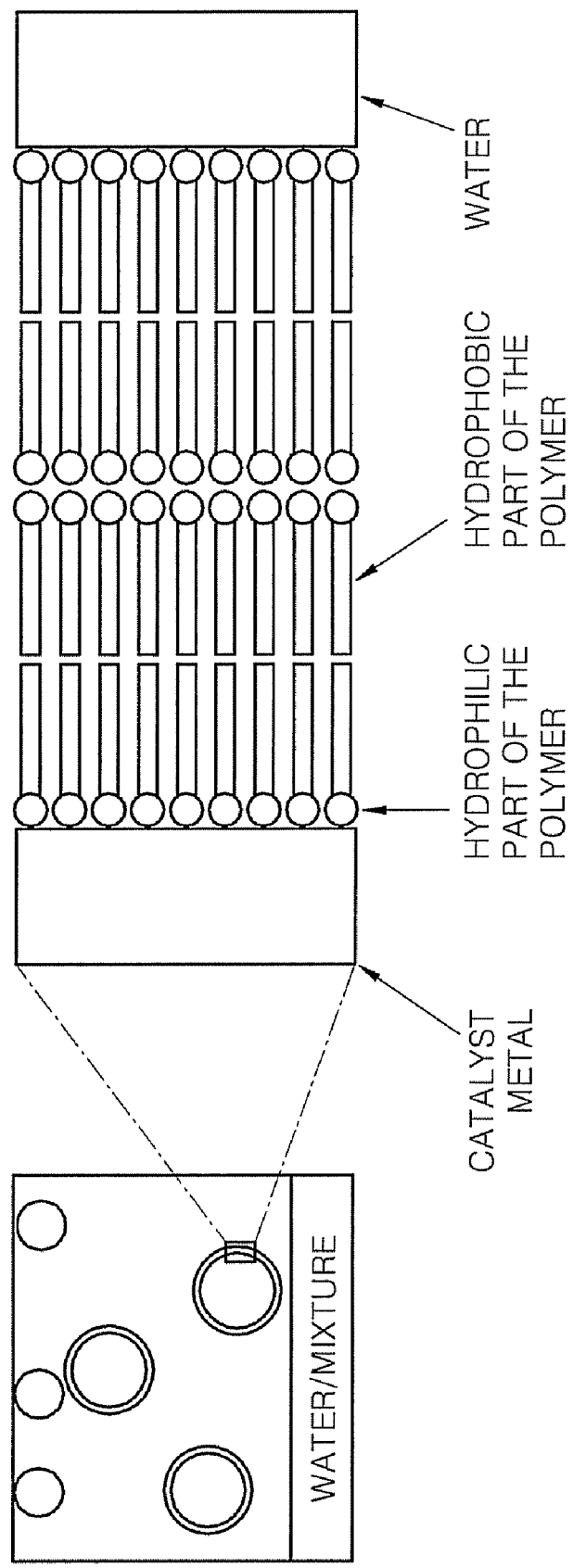
FIG. 4 is an exemplary depiction that schematically shows a stack of polymers having a hydrophilic part and a hydrophobic part.

In addition, the amphiphilic polymer, which is a self-assembling polymer includes a hydrophilic part and a hydrophobic part in a single polymeric molecule. As shown in FIG. 4, the hydrophilic part of the polymer combines with the hydrophilic graphitizing catalyst so as to be uniformly aligned on the catalyst layer, and the hydrophobic part of the amphiphilic polymer is aligned in the opposite direction to be combined with the hydrophilic part of another amphiphilic polymer that is not combined with the catalyst layer. When the amount of the amphiphilic polymer is sufficient, the amphiphilic polymer can be stacked on the catalyst layer by the hydrophilic-hydrophobic bonds. The stacked layers formed of a plurality of the amphiphilic polymers can form a graphene layer by heat-treatment. Thus, a graphene sheet having a desired thickness can be prepared since the number of layers of the graphene sheet can be controlled by selecting an appropriate amphiphilic polymer and adjusting the amount of the amphiphilic polymer.

The number of layers of the graphene sheets may be from about 1 up to about 300, preferably in the range of about 1 to about 60, and more preferably in the range of about 1 to about 15. A graphene sheet having over about 300 layers is regarded as graphite, which is not within the scope of the present invention.

The area of the graphene sheet is dependent upon the size of the substrate and is controlled by regulating the size of the substrate on which the graphitizing catalyst is formed, and thus a large-area graphene sheet can be prepared without difficulty. That is, a large-area graphene sheet can be prepared by preparing a substrate having a large surface area, for example, a substrate having an area greater than 1 millimeter (mm)×1 mm, and preferably in the range of about 1 mm×1 mm (1 $mm^2$) to about 1,000 mm×1,000 ($10^6$ $mm^2$) mm, forming a graphitizing catalyst on the substrate using various methods, coating the polymer on the graphitizing catalyst, and heat-treating the resultant. Accordingly, the area of the graphene sheet can be adjusted by merely controlling the size of the substrate. The substrate may be a silicon substrate, but is not limited thereto.

As described above, the width and length of the graphene sheet may be respectively about 1 mm or longer, preferably about 10 mm or longer, and more preferably in the range of about 10 mm to about 1,000 mm. When the length of the graphene sheet is greater than about 1,000 mm, properties of the graphene sheet can be degraded since the deficiencies in the graphene sheet may be substantially increased.

The polymer coated on the graphitizing catalyst is heat-treated to graphitize the polymer. The heat-treatment can be performed in an inert or reductive atmosphere in order to prevent oxidation of the elements of the polymer. The heat-treatment is performed at a temperature of about 400 to about 2,000° C. When the temperature is lower than about 400° C., the graphitization cannot be sufficiently performed. On the other hand, when the temperature is higher than about 2,000° C., carbon may be evaporated. The heat-treatment may be performed for about 0.1 to about 10 hours. When the heat-treatment time is not within the range described above, the graphitization cannot be sufficiently performed or costs may be increased.

The heat-treatment may be performed by using sources of electromagnetic radiation. In one embodiment, the heat treatment can be accomplished using induction heatings, radiated energy, laser, infrared rays (IR), microwaves, plasma, ultraviolet (UV) rays or surface plasmon heatings without limitation. In another embodiment, it is desirable for the graphitizing catalyst on which the polymer is coated to be activated by selectively heating the catalyst by induction heating or by using microwaves. Thus, a specific region can be graphitized, and a single-layered graphene sheet can be prepared by graphitizing a polymer of a small thickness. The carbon atoms can be covalently bound to each other by the heat-treatment. For example, the carbon atoms form a planar hexagonal structure to form the graphene sheet on the substrate, and thus the graphene sheet forms a graphene substrate with the substrate. Herein, the term "graphene substrate" indicates a combination of the substrate and the graphene sheet formed on the substrate.

Thus formed graphene sheet exists on the substrate and the graphitizing catalyst layer. The graphene sheet can be used with the graphitizing catalyst, or alternatively, the graphene sheet can be used, if required, by dissolving and removing the graphitizing catalyst by an acid-treatment. If required, the graphene sheet may be separated from the substrate.

An exemplary acid used for separating the graphene sheet from the graphitizing catalyst is an HCl solution.

The separated graphene sheet can be processed in a variety of ways according to its desired use. That is, the graphene sheet can be cut into a predetermined shape, or can be wound to form a tube. The processed graphene sheet can be combined with a desired subject for applications.

The graphene sheet can be applied in various fields. The graphene sheet can be efficiently used in a transparent electrode since it has excellent conductivity and high uniformity. An electrode that is used on a substrate of solar cells, or the like, can be formed to meet transparency requirements since light needs to penetrate therethrough. The graphene sheet when used in a transparent electrode has excellent conductivity. In addition, the flexibility of the graphene sheet permits it to be used in a flexible transparent electrode. A flexible solar cell can be prepared by using a flexible plastic as a substrate with the graphene sheet as a transparent electrode being disposed upon the flexible plastic. In addition, when the graphene sheet is used as a conductive thin film for various display devices, the desired conductivity can be achieved using only a small amount of electrical energy. In addition, the light penetration can be improved.

In addition, the graphene sheet formed in the form of a tube can be used as an optical fiber, a hydrogen storage medium or a membrane that selectively allows hydrogen to penetrate.

The present invention provides a process for economically preparing a large-area graphene sheet, and efficiently controlling the thickness of the graphene sheet. The graphene sheet can be efficiently applied to a transparent electrode, a hydrogen storage medium, an optical fiber, an electrical device, or the like since a large-area graphene sheet having a desired thickness can be obtained.

The present invention will now be described in greater detail with reference to the following examples. The following examples are for illustrative purposes only and are not intended to limit the scope of the invention.

EXAMPLES

Example 1

Ni was deposited on a 3 centimeter (cm)×3 cm silicon substrate on which 100 nanometers (nm) of $SiO_2$ was coated using sputtering to form a Ni thin film. An oleic acid solution having a concentration of 1 milligram per milliliter (mg/ml)

(in chloroform) was prepared by dissolving oleic acid in chloroform. 50 microliters (μl) of the oleic acid solution was added to a Langmuir-Blodgett (LB) device that contained water. After the oleic acid solution was added, a self assembled monolayer (SAM) was prepared using the LB device. 254 nm ultraviolet (UV) radiation was used to polymerize the SAM layer formed of oleic acid. The obtained oleic acid SAM was transferred to a 3 cm×3 cm silicon substrate on which 100 nm of $SiO_2$ was coated.

Then, the oleic acid coated substrate was heated in a vacuum at 60° C. for 12 hours and dried. The dried oleic acid coated substrate was heat-treated in a furnace under a nitrogen atmosphere 500° C. for 1 hour to prepare a substrate having an area of 3 cm×3 cm and a single-layered graphene sheet. Then, the substrate including the graphene sheet was immersed in 0.1 M HCl for 24 hours to remove the Ni thin film. The graphene sheet was thus separated.

Example 2

A 3 cm×3 cm graphene sheet having about 10 layers was prepared in the same manner as in Example 1, except that transferring of the oleic acid SAM polymerized according to Example 1 to the silicon substrate was repeated 10 times.

Example 3

A 3 cm×3 cm graphene sheet having about 21 layers was prepared in the same manner as in Example 1, except that transferring of the oleic acid SAM polymerized according to Example 1 to the silicon substrate was repeated 20 times.

Example 4

A 3 cm×3 cm graphene sheet having about 43 layers was prepared in the same manner as in Example 1, except that transferring of the oleic acid SAM polymerized according to Example 1 to the silicon substrate was repeated 40 times.

Example 5

Ni was deposited on a silicon substrate having a diameter of 4 inches on which 100 nm of $SiO_2$ was coated using sputtering to form a Ni thin film. The substrate on which Ni was immobilized was immersed in a mixed solution of 0.1 L of water and 100 μg of oleic acid and stirred at 200 rpm. After 4 hours, the substrate was heated in a vacuum at 60° C. for 12 hours to remove water. The dried oleic acid coated substrate was heat-treated under a nitrogen atmosphere in a furnace at 500° C. for 1 to obtain a graphene sheet having about 3 layers that were 4 inches in diameter.

Then, the substrate including the graphene sheet was immersed in 0.1 M HCl for 24 hours to remove the Ni thin film and the graphene sheet was separated.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A process of preparing a graphene sheet, the process comprising:
   forming a graphitizing catalyst in the form of a sheet;
   forming a sheet of polymer on the graphitizing catalyst; and
   heat-treating the polymer on the graphitizing catalyst in an inert or reductive atmosphere to form a graphene sheet, wherein a width and a length of the graphene sheet are each about 1 millimeter or greater.

2. The process of claim 1, wherein the graphitizing catalyst is at least one catalyst selected from the group consisting of Ni, Co, Fe, Pt, Au, Al, Cr, Cu, Mg, Mn, Mo, Rh, Si, Ta, Ti, W, U, V and Zr.

3. The process of claim 1, wherein the polymer is a self-assembling polymer.

4. The process of claim 1, wherein the polymer is selected from the group consisting of an amphiphilic polymer, a liquid crystal polymer and a conductive polymer.

5. The process of claim 4, wherein the amphiphilic polymer comprises:
   a hydrophilic group selected from the group consisting of an amino group, a hydroxyl group, a carboxyl group, a sulfate group, a sulfonate group, a phosphate group and salts thereof; and
   a hydrophobic group having at least one selected from the group consisting of a halogen atom, a C1-C30 alkyl group, a C1-C30 halogenated alkyl group, a C2-C30 alkenyl group, a C2-C30 halogenated alkenyl group, a C2-C30 alkynyl group, a C2-C30 halogenated alkynyl group, a C1-C30 alkoxy group, a C1-C30 halogenated alkoxy group, a C1-C30 hetero alkyl group, a C1-C30 halogenated hetero alkyl group, a C6-C30 aryl group, a C6-C30 halogenated aryl group, a C7-C30 arylalkyl group and a C7-C30 halogenated arylalkyl group.

6. The process of claim 4, wherein the amphiphilic polymer is selected from the group consisting of capric acid, lauric acid, palmitic acid, stearic acid, myristoleic acid, palmitolic acid, oleic acid, stearidonic acid, linolenic acid, capryl amine, lauryl amine, stearyl amine and oleyl amine.

7. The process of claim 4, wherein the conductive polymer is selected from the group consisting of polyacetylene, polypyrrole, polythiophene, polyaniline, polyfluorene, poly(3-hexylthiophene), polynaphthalene, poly(p-phenylene sulfide) and poly(p-phenylene vinylene).

8. The process of claim 4, wherein the conductive polymer is selected from the group consisting of acene and its derivatives, hetero acene and its derivatives, anthracene and its derivatives, hetero anthracene and its derivatives, tetracene and its derivatives, hetero tetracene and its derivatives, pentacene and its derivatives, and hetero pentacene and its derivatives.

9. The process of claim 1, wherein the polymer comprises a polymerizable functional group.

10. The process of claim 9, further comprising polymerizing the polymer prior to disposing the polymer on the graphitizing catalyst.

11. The process of claim 9, further comprising polymerizing the polymer including the polymerizable functional group after coating the polymer or a polymer precursor on the graphitizing catalyst.

12. The process of claim 1, wherein the heat-treating is performed at a temperature of about 400 to about 2,000° C. for about 0.1 to about 10 hours.

13. The process of claim 1, wherein the graphitizing catalyst is immobilized on a substrate.

14. The process of claim 1, further comprising separating the graphene sheet from the graphitizing catalyst by using an acid-treatment after the heat-treatment.

15. The process of claim 1, wherein the thickness of the graphene sheet is controlled by adjusting the amount of the polymer that is disposed upon the graphitizing catalyst.

16. The process of claim 1, wherein the heat-treatment is performed by induction heating, radiating heat energy, laser, infrared rays, microwaves, plasma, ultraviolet rays or surface plasmon heating.

17. The process of claim 1, wherein the heat-treatment is selectively applied to the graphitizing catalyst.

18. The process of claim 1, wherein the polymer is a thermoplastic polymer, a thermosetting polymer, a blend of thermoplastic polymers, a blend of thermosetting polymers, or a blend of a thermoplastic polymer with a thermosetting polymer.

19. The process of claim 1, wherein the polymer is an oligomer, a homopolymer, a copolymer, a block copolymer, an alternating block copolymer, a random copolymer, a random block copolymer, a graft copolymer, a star block copolymer, a dendrimer, or a combination comprising at last one of the foregoing polymers.

20. The process of claim 4, wherein the conducting polymer is further copolymerized with an electrically non-conducting polymer.

* * * * *